R. DORITY, G. E. IJAMS AND H. W. BREINING.
COMBINED STATEMENT AND RETURN ENVELOP.
APPLICATION FILED DEC. 9, 1920.

1,371,670.

Patented Mar. 15, 1921.

INVENTORS
Ralph Dority,
George E. Ijams &
Harold W. Breining
BY
Shepherd & Campbell
ATTORNEYS.

UNITED STATES PATENT OFFICE.

RALPH DORITY, OF WASHINGTON, DISTRICT OF COLUMBIA, GEORGE E. IJAMS, OF BALTIMORE, MARYLAND, AND HAROLD W. BREINING, OF WASHINGTON, DISTRICT OF COLUMBIA.

COMBINED STATEMENT AND RETURN ENVELOP.

1,371,670.        Specification of Letters Patent.        Patented Mar. 15, 1921.

Application filed December 9, 1920. Serial No. 429,384.

*To all whom it may concern:*

Be it known that we, RALPH DORITY, GEORGE E. IJAMS, and HAROLD W. BREINING, citizens of the United States, the said Dority and Breining, residing at Washington, D. C., and the said Ijams residing at Baltimore, Maryland, have invented certain new and useful Improvements in Combined Statement and Return Envelops, of which the following is a specification, reference being had therein to the accompanying drawings.

The object of the invention is to provide a combined statement and return envelop through the medium of which the transaction of certain businesses may be greatly facilitated and much annoyance and loss of time avoided.

The failure of persons making remittances to properly identify themselves or to clearly indicate the manner in which said remittances are to be applied leads to many mistakes and involves much annoyance and loss of time upon the part of the persons receiving such remittances. For example: John Smith, of Fremont, Ohio, may be carrying several fire insurance policies with the National Fire Insurance Company, of New Jersey. After he has remitted for the premiums several years in succession, he feels that he is so well known to the company that it is unnecessary for him to specify how his remittances are to be applied, or to be very careful in identifying himself when making such remittances. Therefore, the insurance company is likely to receive a money order lumping all of the premiums in one sum and signed by John Smith, of Fremont, Ohio, without any identifying matter such as the numbers or the nature of the policies to which the remittances relate. It is manifest that under such circumstances as these the money can be applied only after a careful investigation of its records by the fire insurance company and that the work of making such investigation will be greatly complicated if the company happens to have other policy holders by the name of John Smith in Fremont, Ohio. The combined statement and envelop of the present invention aims to obviate the foregoing difficulties by combining with the usual return, self-addressed envelop sent out by business houses for the return of remittances, such a statement of the account to which the remittance is to relate that such statement will of necessity be returned with the remittance. The invention goes further and renders such statements detachable from the envelop after its return, so that it may be returned to the sender as a receipt. The invention goes still further and provides for the automatic recordation of a copy of the statement upon the part of the envelop that is left after the main statement is detached, so that an exact copy of the statement is left in the hands of the person to whom the remittance is made and the invention goes still further in that it locates this copy of the statement upon a part of the envolop that will receive the mailing stamp in the post office, so that a record of the time that the remittance was placed in the mails is always available.

Further objects and advantages of the invention will be set forth in the detailed description which follows;

Figure 1:
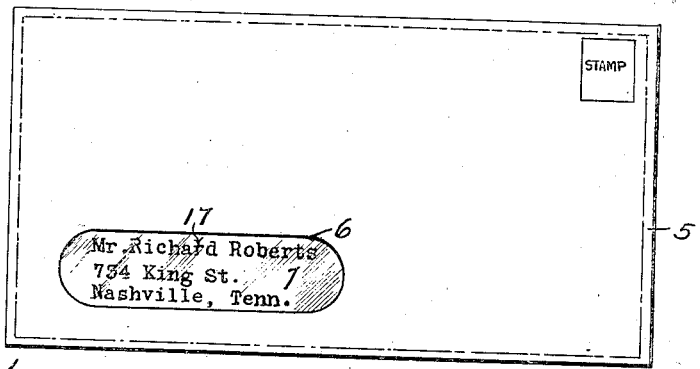
Figure 1 is a face view of an ordinary "window envelop" of a size to receive the return envelop shown in Fig. 2.

In the drawing 5 designates an ordinary window envelop having a sight opening 6 formed therein that is preferably covered with a suitable transparent material 7. The envelop 5 is of a size to receive the return envelop, said return envelop comprising a front wall 8, a rear wall 9 and a flap 10. The flap 10 is adapted to be folded in either direction so that it will cover the wall 9 or the wall 8 as the case may be. The flap 10 is preferably gummed at 11 so that when it is folded over upon the statement carrying rear wall 9 it may be caused to adhere to the portions 12 outwardly of the line of perforations 13. These perforations weaken the rear wall 9 along the line indicated so that the statement 14 may be detached as hereinafter set forth. The front wall 8 bears the address indicated at 15 of the orginal sender and the inside face of the rear wall 9 is covered with carbon or other transfer material indicated at 16, so that when the statement is imprinted upon the outer face of the wall 9 a copy thereof will be made upon the inner face of the front wall 8.

Figure 2:
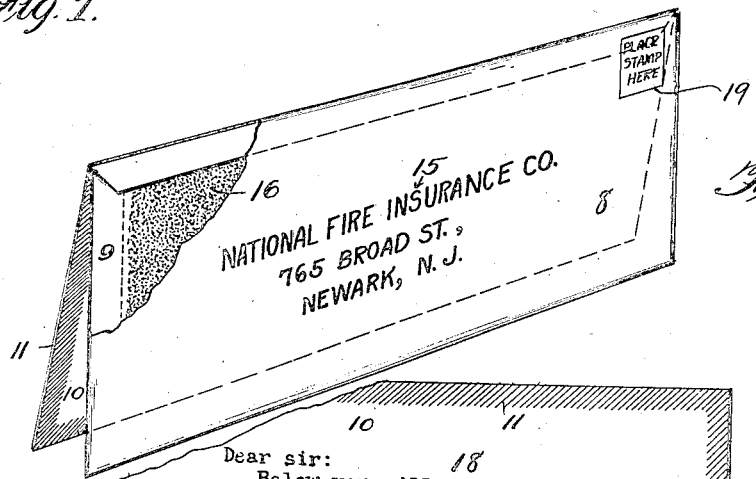
Fig. 2 is a perspective view of the return envelop looking toward the front side thereof.
Figure 3:
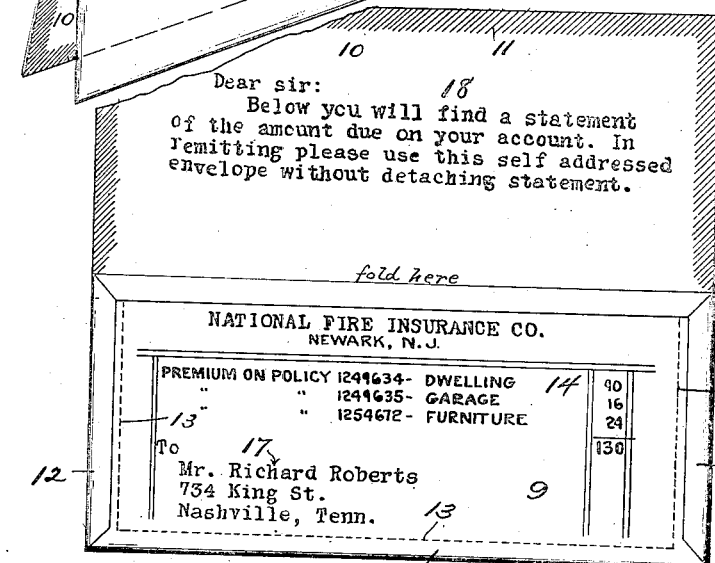
Fig. 3 is a face view of the statement or rear side of said envelop.

The address of the party to whom the statement is being sent is written or printed at 17 in such position that, when the flap 10 is folded over to cover the front wall 8 and the envelop of Figs. 2 and 3 is placed in the envelop 5, the address 17 will show through the transparent material 7. When the person who is to make the remittance receives the envelop 5 and its contents he opens the envelop 5 in the usual way and discards the same. He finds at 18 directions for the use of the return envelop and following these directions he places his check, money order or other remittance in the body portion of the return envelop and seals said envelop by moistening the gummed portion 11 and pasting the same down upon the portion 12 outwardly of the line of perforations 13. After a stamp has been placed upon the front wall 8 at 19, the envelop which is already properly addressed as at 15 is ready to be deposited in the mail. When it is deposited in the mails it receives the usual printed postmark upon the front wall 8. When this envelop reaches the party to whom the remittance is sent, the statement upon the rear wall 9 indicates clearly just how the remittance is to be applied and gives all the data necessary, such as policy numbers or the like, to prevent error in the application of such remittance. A further saving of time and labor is effected by reason of the fact that the statement may be separated along the perforated line 13 from the remainder of the envelop and receipted and returned to the person making the remittance by placing the same in another "sight" envelop 5, the original address 17 again serving its former purpose.

There will then be left in the hands of the person receiving the remittance a copy of the statement (formed by the transfer material 16 upon the inner face of the wall 8) and this copy of the statement will bear upon one side a dated postmark which will establish beyond question the time at which the remittance was made if, for any reason, that question becomes of importance.

The envelop constituting the subject matter of the present invention is applicable in many different lines of business. In fact it is of utility in any business where bills or statements are sent out and remittances are sent in return.

It is to be understood that the invention is not limited to the precise construction set forth but that it includes within its purview whatever changes fairly come within either the terms or the spirit of the appended claims.

Having described our invention, what we claim is:

1. A mailable return and statement envelop comprising in combination a body portion consisting of a front wall and a rear wall, the latter bearing a statement form, and a sealing flap for the envelop of a shape to conceal the statement form upon said rear wall when the envelop is sealed for mailing.

2. A return and statement envelop comprising in combination a body portion consisting of a front wall bearing a return address, a rear wall bearing a statement form and a flap adapted to be folded to a position to uncover address matter of the statement form upon the rear wall to render the same visible through the sight opening of a window envelop and means for securing said flap in position to completely cover the statement form upon said rear wall.

3. A return statement envelop comprising in combination a body portion consisting of a front wall adapted to receive a return address, a rear wall bearing a statement form and having a weakened line to render said major portion separable from the remainder of said wall, and a flap having a gummed portion in position to engage that part of the rear wall which lies outwardly of the said weakened line.

4. A device as recited in claim 3 in combination with transfer material between the inner face of the rear wall and the rear face of the front wall.

5. A structure as recited in claim 3 wherein the inner face of the rear wall is provided with a transfer surface.

6. An envelop comprising a body portion consisting of a front and rear wall and a flap of a shape to cover said rear wall, said rear wall having a weakened portion separating the central portion of said wall from the outer portions thereof.

7. A structure as recited in claim 6 wherein said flap is gummed along its portions which abut those portions of the rear wall which lie outwardly of the said weakened portion.

8. A mailable return and statement envelop comprising a body portion consisting of a front and rear wall and a sealing flap portion, one of said portions bearing a statement form which is concealed by said flap when the envelop is sealed for mailing, said flap being foldable before the envelop is sealed to a position to expose address matter of the statement form through the sight opening of a window envelop when the statement and return envelop is placed in said sight envelop.

In testimony whereof we hereunto affix our signatures.

RALPH DORITY.
GEORGE E. IJAMS.
HAROLD W. BREINING.